United States Patent Office 2,927,948
Patented Mar. 8, 1960

2,927,948

METHOD OF PREPARING ALIPHATIC FLUORINE COMPOUNDS

Otto Scherer, Helmut Hahn, and Heinrich Kühn, Frankfurt am Main, Germany, assignors to Farbwerke Hoechst Aktiengesellschaft vormals Meister Lucius & Brüning, Frankfurt am Main, Germany, a corporation of Germany No Drawing. Application January 28, 1957
Serial No. 636,456

Claims priority, application Germany February 3, 1956

6 Claims. (Cl. 260—653.7)

This invention relates to fluorine containing aliphatic compounds and their preparation.

The preparation of aliphatic fluorine compounds from the corresponding chlorine compounds by means of hydrogen fluoride in the presence of antimony catalysts is already known. In accordance with U.S. Patent No. 2,005,710 there is obtained, for instance from hexachloroethane and hydrogen fluoride at 140–150° C. in the presence of a quantity of antimony catalyst (five times the quantity of hexachloroethane used) a yield of 75% of a mixture of trifluorotrichloroethane and tetrafluorodichloroethane (Examples 13 and 22). If it is desired to prepare primarily tetrafluorodichloroethane, it is necessary to employ lower fluorinated starting materials, for instance trifluorotrichloroethane, in the presence of a large, for instance five times, excess of a catalyst consisting primarily of pentavalent antimony compounds (Example 19). In accordance with a method described in U.S. Patent No. 2,146,725, there is required a large quantitative excess not only of antimony catalyst but also of elemental chlorine using a temperature of 160–165° C.

Also in the case of the method of U.S. Patent No. 2,658,927 (Example 1), despite the use of relatively large quantities of antimony pentachloride, substantially only trifluorotrichloroethane is obtained from hexachloroethane.

One can also operate with small quantities of antimony catalyst (French Patent No. 1,069,872), but in such case, in the above mentioned temperature ranges, there is obtained, for instance from pentachloroethane, only the monofluoro derivative. Even when employing extreme conditions (260° C., 110 atm. gauge, 21 hours) only difluorotrichloroethane is obtained.

It is an object of this invention to provide a process for conducting fluorination reactions efficiently.

It is another object of this invention to provide a process for preparing highly fluorinated aliphatic compounds from the corresponding chlorinated aliphatic compound in high yields.

Various other objects and advantages will become apparent to those skilled in the art on reading the accompanying description and disclosure.

It has now been found that fluorination reactions, using antimony catalysts can be strongly activated if the reaction is carried out in the presence of aluminum, e.g., in an aluminum vessel. This additional activation can also be noted from the accelerated course of the reaction and the relatively low reaction temperatures.

The use of aluminum vessels has not only the advantage that the reaction is activated but also the advantage of the increased life of the vessel. Fluorination reactions using antimony catalysts have been carried out, up to the present time, in vessels of steel, steel alloys, copper or copper-nickel alloys. Vessels of these substances however undergo considerable corrosion under normal reaction conditions. It has been found experimentally, for instance, that practically no corrosion of the aluminum vessels can be observed even after about 100 batches while the aforementioned materials are so extensively attacked even after 50–60 batches that they must be replaced.

As antimony catalysts, there can be used antimonous halides in the presence of elemental chlorine as well as antimonic halides.

For instance, in an aluminum vessel there are obtained from 5 parts by weight hexachloroethane and 1 part by weight of a trivalent antimony halide, for instance, $SbF_3$, with the addition of a small quantity of elemental chlorine, a good yield of a mixture of tetrafluorodichloroethane and trifluorotrichloroethane depending on the quantity of the hydrogen fluoride employed. The original catalyst retains its activity for a large number of batches. When using trivalent antimony compounds, it is sufficient to add a small quantity of elemental chlorine before each batch. Under the above conditions, trifluorodichloroethane and difluorotrichloroethane are obtained from pentachloroethane depending on the quantity of the hydrofluoric acid used. This clearly demonstrates that aluminum strongly activates the fluorination reaction.

It has additionally been found that the reaction can be still further activated by adding a small quantity of an arsenic halide such as arsenic trichloride and arsenic trifluoride to the antimony halide. The addition of the arsenic halide can be accomplished by boiling out the reaction vessel, for instance the autoclave, with the arsenic halide, e.g., arsenic trifluoride, before use in order to assure the activation of a large number of batches. However, best results are obtained when between about 0.1 and about 10% arsenic halide based on the quantity of the antimony catalyst is added to each batch. The yield of higher fluorinated products is in this way considerably increased.

In order to illustrate the process of this invention, the following examples, which are not to be construed as unnecessarily limiting, are presented.

*Example 1*

In a 30 liter aluminum autoclave, 20 kg. pentachloroethane and 5.5 kg. hydrofluoric acid are heated in the presence of 3.5 kg. antimony trifluoride and 200 grams of chlorine at 140–150° C. Under these conditions, the pressure rises to 50 atm. gauge. The hydrochloric acid formed is blown off over the course of 10–15 hours via a high pressure valve. The fluorine compounds produced are distilled out of the autoclave. There is obtained 48% of the theoretical yield of trifluorodichloroethane and 43% of the theoretical yield of difluorotrichloroethane.

*Example 2*

2,370 grams of hexachloroethane are heated at 145–150° C. in a 6 liter aluminum bomb with 800 grams HF in the presence of 450 grams antimony trifluoride and 30 grams chlorine. Under these conditions, the pressure increases to about 50 atm. gauge. The hydrochloric acid formed is blown off within 15 hours. After the reaction products have been distilled out of the aluminum vessel, there is obtained upon distillation 39% of the theoretical yield of tetrafluorodichloroethane (Freon 114) and 51% of the theoretical yield of trifluorotrichloroethane (Freon 113).

*Example 3*

2,370 grams of hexachlorethane are heated in the presence of 450 grams of antimony trifluoride (500 grams $SbCl_3$ and 150 grams HF), 850 grams HF and 30 grams chlorine as well as 45 grams arsenic trichloride at 130–

135° C. in an aluminum vessel. Under these conditions the pressure increases to 50-60 atmospheres gauge. The hydrochloric acid formed is let off in five hours. The distillation of the reaction products gives 78% of the theoretical amount of tetrafluorodichlorethane together with 16% of the theoretical amount of trifluorotrichlorethane.

*Example 4*

(a) A closed, pressure-resistant aluminum vessel is filled with 750 grams of antimony trifluoride
1275 grams of methylene chloride (15 mols)
720 grams of hydrogen fluoride and
50 grams of chlorine.

At a temperature of 120–130° C. the pressure increases rapidly to 40–50 atmospheres. The hydrogen chloride and methylene fluoride formed are slowly withdrawn. After degassing for a period of about 8 hours, methylene fluoride is obtained in a yield of 720 grams corresponding to 92% of the theoretical amount. The compound obtained boils at −51° C.

(b) The conditions are the same with the exception, however, that an iron, pressure-resistant vessel is used. After degassing for 14 hours, methylene fluoride is obtained in a yield of only 520 grams corresponding to 67% of the theoretical amount.

*Example 5*

(a) A closed aluminum vessel into which were previously introduced 500 grams of antimony trichloride, is filled with 1052 grams of trichlorethylene (8 mols), 600 grams of hydrogen fluoride and 50 grams of chlorine. At a temperature of 130° C., the pressure increases rapidly to about 50 atmospheres gauge. The hydrogen chloride formed and the reaction product are slowly withdrawn through a high pressure valve. After degassing for 8 hours, there are obtained 785 grams of 1.1.1-trifluorethyl chloride corresponding to a theoretical yield of 83%. The compound boils at +6° C.

(a) The conditions are otherwise the same with the exception, however, that an iron vessel is used. 1.1.1-trifluorethyl chloride is obtained in a poor yield and varying quantities. The product obtained consists essentially of 1.1-difluoro-1.2-dichlorethane. The optimum yield in 1.1.1-trifluorethyl chloride is 30–40% of the theoretical value.

In a manner analogous to that described above there may also be reacted 1,2-dichlorethylene, 2-fluoroheptachloropropane and 1.2.3.4-tetrafluorohexachlorobutane.

Various modifications and alterations of the process of this invention will be apparent to those skilled in the art and may be used without departing from the scope of this invention.

We claim:

1. A method for preparing a highly fluorinated aliphatic compound which comprises the single step of fluorinating a chlorinated hydrocarbon with hydrogen fluoride in the presence of aluminum, elemental chlorine, and a catalyst consisting esssentially of antimony trihalide admixed with between about 0.1 and about 10 percent by weight of arsenic trihalide.

2. The method of claim 1 wherein the antimony trihalide is antimony trifluoride.

3. The method of claim 1 wherein the arsenic trihalide is selected from the group consisting of arsenic trichloride and arsenic trifluoride.

4. A method for preparing a highly fluorinated aliphatic compound which comprises the single step of fluorinating a chlorinated alkane with hydrogen fluoride at a temperature between about 130–135° C. in the presence of aluminum, elemental chlorine, and a catalyst consisting essentially of antimony trifluoride admixed with between about 0.1 and about 10 percent by weight of arsenic trichloride.

5. The method of claim 4 wherein the chlorinated alkane is pentachloroethane.

6. The method of claim 4 wherein the chlorinated alkane is hexachloroethane.

References Cited in the file of this patent

UNITED STATES PATENTS

| | | |
|---|---|---|
| 2,005,710 | Daudt et al. | June 18, 1935 |
| 2,549,988 | Perkins | Apr. 24, 1951 |
| 2,757,213 | Coffman et al. | July 31, 1956 |
| 2,768,983 | Couper et al. | Oct. 30, 1956 |